United States Patent
Kebets et al.

(10) Patent No.: US 11,194,596 B2
(45) Date of Patent: Dec. 7, 2021

(54) SIMULATING HUMAN INTERFACE INTERACTION RESILIENT TO USER INTERFACE CHANGES

(71) Applicant: LendingClub Corporation, San Francisco, CA (US)

(72) Inventors: Paul Kebets, Rocklin, CA (US); Vadim Delendik, Minsk (BY); Aliaksei Khursevich, Minsk (BY); Sasha Yavorski, San Jose, CA (US)

(73) Assignee: LENDINGCLUB CORPORATION, San Francisco, CA (US)

( * ) Notice: Subject to any disclaimer, the term of this patent is extended or adjusted under 35 U.S.C. 154(b) by 51 days.

(21) Appl. No.: 15/827,201

(22) Filed: Nov. 30, 2017

(65) Prior Publication Data

US 2019/0163499 A1 May 30, 2019

(51) Int. Cl.
| | |
|---|---|
| *G06F 9/44* | (2018.01) |
| *G06K 9/20* | (2006.01) |
| *G06K 9/62* | (2006.01) |
| *G06N 20/00* | (2019.01) |
| *G06F 9/451* | (2018.01) |
| *G06F 11/36* | (2006.01) |

(52) U.S. Cl.
CPC .............. *G06F 9/451* (2018.02); *G06F 11/36* (2013.01); *G06K 9/2054* (2013.01); *G06K 9/6256* (2013.01); *G06K 9/6262* (2013.01); *G06N 20/00* (2019.01)

(58) Field of Classification Search
CPC ...... G06F 9/451; G06F 11/36; G06F 11/3688; G06N 20/00; G06N 3/0454; G06N 3/0481; G06N 3/0445; G06N 3/08; G06K 9/2054; G06K 9/6262; G06K 9/6256
See application file for complete search history.

(56) References Cited

U.S. PATENT DOCUMENTS

| | | | |
|---|---|---|---|
| 2010/0027896 A1* | 2/2010 | Geva ....................... | G06K 9/72 382/229 |
| 2012/0204091 A1* | 8/2012 | Sullivan ............... | G06F 11/3664 715/234 |
| 2015/0339213 A1* | 11/2015 | Lee ....................... | G06F 3/0484 717/125 |

(Continued)

*Primary Examiner* — Stephen S Hong
*Assistant Examiner* — Ahamed I Nazar
(74) *Attorney, Agent, or Firm* — Hickman Becker Bingham Ledesma LLP

(57) ABSTRACT

Techniques for simulating human interface interaction resilient to user interface changes are presented. Automated analysis is performed on an image of a user interface of a computer program that is to be a target of simulated user interactions, and that determines the location and interaction purpose of a particular control on the user interface. An interaction package is read, and it indicates one or more interaction purposes that are to be carried out through interactions with the user interface of the computer program. Interaction with the user interface is simulated to carry out the one or more interaction purposes, where the particular interaction purpose is among the one of the one or more interaction purposes and simulating user interactions includes simulating user interaction with the particular control, based on the determined location and particular interaction purpose.

13 Claims, 5 Drawing Sheets

(56) References Cited

U.S. PATENT DOCUMENTS

| | | | |
|---|---|---|---|
| 2016/0019049 A1* | 1/2016 | Kakhandiki | G06F 8/658 |
| | | | 717/168 |
| 2016/0103811 A1* | 4/2016 | Cullen | G06F 40/279 |
| | | | 715/256 |
| 2017/0262363 A1* | 9/2017 | Suttle | G06F 11/3684 |
| 2018/0246801 A1* | 8/2018 | Krauss | G06F 11/3612 |

\* cited by examiner

SIMULATING HUMAN INTERFACE INTERACTION RESILIENT TO USER INTERFACE CHANGES

FIELD OF THE INVENTION

The present invention relates to storing information related to automated system to test interactions with system interfaces, and more particularly to simulating human interface interaction resilient to user interface changes.

BACKGROUND

Software testing is an important part of product deployment. Software testing may be performed by automatically causing software to run through sets of test cases to see if the software produces the expected results. The task of running those test cases can be automated to save time and eliminate human error. When running an automated test case, the testing system simulates user interaction with the software that is being tested. For example, the software being tested may display an interface with certain controls, and to run the test case the testing system may need to interact a certain way with those controls (e.g. fill in a particular form field with certain information and then press a certain button). It is desirable to re-test each new version of a software product. However, the automated testing of a new version of software can be complicated by the fact that the new version of the software may present different user interfaces than the version that was previously tested. Thus, testing scripts that have been written to interact with the user interface of version 1 of a software program will often break with even the smallest change in the user interface when run against version 2 of the software program. If a control moves, changes font, text, etc., it can break the test script.

The problem with script breaking in the face of small user interface changes has been exacerbated by the wide adoption of "AB" testing. AB testing, in short is the simultaneous serving of two interfaces, the original "A" interface, and a new test "B" interface. The balance of A and B interfaces being served can usually be set by the quality assurance or testing department. The balance of A to B may be 99:1, 9999:1, or 9:1. AB testing allows organizations to quickly see the impact of a new interface without exposing the new interface to its entire customer population. This encourages very rapid user interface changes, by allowing small changes to be propagated and tested easily. With each of these user interface changes, even what a customer might see as minor, the issue of potentially breaking test scripts remains.

The techniques herein address these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

FIG. 5A and FIG. 5B depict example images of user interfaces with controls.

DETAILED DESCRIPTION

Figure 1:
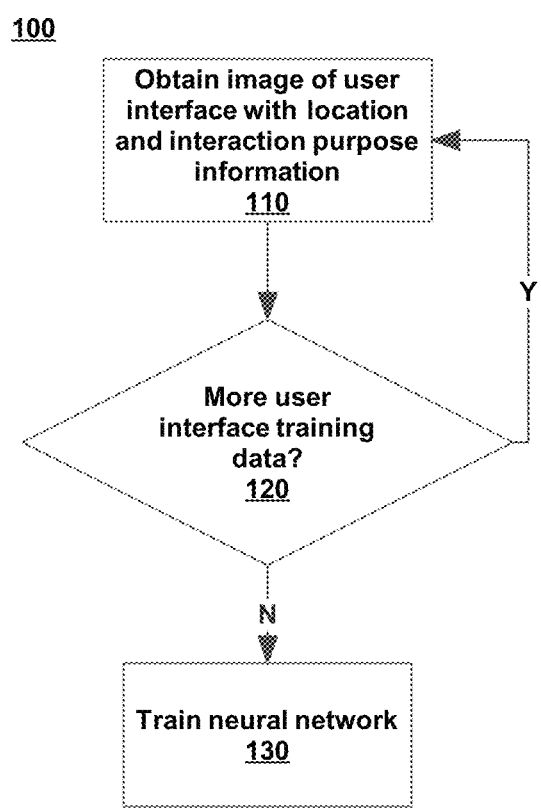
FIG. 1 depicts a process for training a neural network to detect user interface controls.

In the following description, for the purposes of explanation, numerous specific details are set forth in order to provide a thorough understanding of the present invention. It will be apparent, however, that the present invention may be practiced without these specific details. In other instances, well-known structures and devices are depicted in block diagram form in order to avoid unnecessarily obscuring the present invention.

General Overview

Simulating user interaction with computer systems is growing in importance. It can be used for a number of tasks, including user interface testing. Further, user interface testing is important. The user interface is the only way most users will interact with software. A small issue in a user interface can cause significant usability issues and may possibly foil the business purpose of the underlying application. For example, if a new user interface is deployed, and it is responsive, looks good, and is easy to understand, but mistakenly does not collect a critical piece of information, that user interface will fail. On the flip side, a user interface that collects all of the appropriate information, but does so in a way that is difficult for a user to understand may make the product less successful because of the poor interaction.

As a result of these two things, user interface testing has become very important. Traditionally, human quality assurance personnel tested user interfaces. This is a fairly cumbersome task, especially for complex user interfaces. As a result, much user interface testing has been automated. Automatic user interface testing can be performed by constructing a script that simulates the interaction with the user interface, thereby detecting any errors with the user interface. The issue with an automated script is, however, that such scripts are not resilient in the face of small user interface changes. For example, if the user interface test script relies on interpretation of CSS or HTML, or location of an interface element, and there is a minor CSS change (even if it is not an error), a change in a tag used in the HTML for an input field, or an interface control has moved, this could cause an interaction script to fail because of the script's reliance on aspects of the CSS, HTML, or location. For example, if an interaction script relied on finding the token "first name" in the interface source code and instead found "first given name", then the script would fail. The script would then need to be updated in order to rely on the new token.

"AB testing", described elsewhere herein, has increased the prevalence of this issue. AB testing allows very fast prototyping of user interfaces and therefore encourages small changes. AB testing also allows testing with real users. So, determination of whether an interface is better or worse than a previous one can be accomplished. Returning to the idea of developing test scripts for user interface testing. In order to test a user interface undergoing user AB testing, the script will have been built for testing the "A" interface, and may fail on the new "B" interface. When it does fail, the interaction script must be updated to handle both user interfaces. That is, the interaction script has to be updated with conditional code in it to determine whether to use the portion of the interaction script focused on the original "A" interface or the new "B" interface. As stated above, however, AB testing encourages frequent, small changes. So, the user interface script will break regularly, and have to be updated regularly. Further, it will become untenable because it will have so many conditionals in it to detect a long series of potential modifications in user interfaces.

Techniques herein address these issues by detecting user interface controls and interaction purposes for those controls. Specifically, an input image of a user interface is analyzed to determine the location and interaction purpose of controls on the user interface. Based on the location and interaction purpose, the interaction data can be input into the user interface in order to test the user interface. The interaction data may be part of an "interaction package", which, in some embodiments, also includes an interaction script. In some embodiments, before analyzing an image of the user interface, the interaction script will attempt to input data into the user interface and, only if the interaction script fails to properly interact with the control, will an image of the user interface be taken, and an analysis of an image of the user interface be performed, and interaction with the user interface be determined based on the analysis of the image of the user interface.

More details of the techniques are given herein.

Although many of the examples herein refer to user interface testing, the techniques apply outside of user interface testing. The techniques enable simulated user interaction, regardless of whether the context of such simulated user interaction is testing, or is being done for some other purpose.

Example Process for Training a Neural Network to Detect User Interface Controls

FIG. 1 depicts a process 100 for training a neural network to detect user interface controls. Process 100 proceeds by repeatedly obtaining 110 images of user interfaces along with locations and interaction purposes for controls the interfaces. As long as there are more 120 interface training data, the process 100 will obtain 110 more interface images. When there are no more interface images, the process 100 proceeds by training 130 a neural network. This trained neural network is then used for simulating user interface interactions resilient to user interface changes, as described elsewhere herein.

Returning to the top of process 100, an image of a user interface is obtained 110 along with locations and interaction purposes of controls. As noted below, images of user interfaces will be obtained 110 as there are more 120 images. Images may be of user interfaces with similar interface controls and may represent numerous possible flows (including multiple user interface page flows) for user interfaces for one or more programs. The images obtained 110 may all have the same interaction purposes represented (possibly each in a single image, possibly cumulatively in multiple images), or may represent a variety of overlapping or different interaction purposes. For example, all of the images obtained 110 may relate to a user interface flow for signing up for a loan, or may relate to divergent flows, with some relating to signing up for a loan, some relating to singing up to be a lender, some relating to signing up for a new customer account, etc.

The obtained 110 images may include a broad range of user interface types. For example, some of the images may depict user interfaces that are rendered HTML, while others may depict interfaces that are generated dynamically with scripting languages and/or other techniques, though the obtained 110 images will not include this underlying information about how they are rendered. The images themselves may be of any appropriate format, including JPEG, PNG, TIF, GIF, etc.

Each obtained 110 image will have therewith associated identification of locations and interactions purposes for one or more controls depicted in the image. The locations of the controls may be of any appropriate form and format. In some embodiments, the controls are identified by the center location of the control. For example, in image 500 of a user interface, the center of control 520 may be represented by the center of text box control 520. In some embodiments the controls are identified by multiple locations, such as the upper-left and lower right corners of the control (e.g., text box control 520). The locations, in some embodiments, are bounding shapes (such as bounding boxes) around the control. For example, turning again to image 500 of FIG. 5A, the location of text box control 520 may be a bounding box around the text box control 520. The locations of the controls can be in pixel space (e.g., with 0,0 being the upper left pixel), in a percentile location with respect to the image (e.g., 0-100% in each axial direction), in physical measurement space (e.g., 0" through height in one direction and 0" through width in the other), or in any other appropriate and recognizable location format. In some embodiments, the locations are designated by a human operator who has used a user interface to select the locations of the controls. In various embodiments, the locations and/or interaction purposes may be indicated in JSON, other plain text (e.g., a comma-delimited list), binary, or the like.

In some embodiments, the interaction purposes of the obtained images can include any appropriate interaction purpose. For example, the obtained 110 controls may have interaction purposes related to customer information, such as name, address, choices among options (such as among products offered), and the like. Interaction purposes and/or controls may be associated with a set of interaction purposes, such as a hierarchy of purposes. For example, in image 500, full name text box control 520 may be associated with a "full name" interaction purpose, "first name" and "last name" interaction purposes, "given names" and "family name" interaction purposes, etc. As another example, first name text box control 521 in image 501 may be associated with a "first name" interaction purpose but not a "last name" interaction purpose, which would be instead associated with the last name text box control 522. The breadth of interaction purposes is not, in effect, limited in any way except what is appropriate for the what the interface is accomplishing. For example, if appropriate for the interaction with the system and the user interface, the interaction purpose may include personal information such as vehicle identification number, driver's license number, license plate number, etc.

The control information for the obtained 110 image may include all or a subset of the location and interaction purposes of controls depicted in the image. For example, in some embodiments, there may be multiple controls depicted in an image and not all of those controls may have information obtained 110 along with the image. For example, image 500 depicts an advertisement with an ad text box 590. In some embodiments, if the ad text box 590 is not related to an interaction purpose relevant to the flows of the user interfaces, then it may be ignored by the techniques herein.

Although more images will typically be better for training the neural network, any number of images may be used. Further, the images may all depict the same set of interaction purposes (as discussed elsewhere herein) or may depict multiple sets of interaction purposes. For example, one set of interaction purposes may relate to signing up for an automobile refinance loan, and another set of interaction purposes may relate to signing up for a lender account. All of these images and related interaction purposes may be used to train the same neural network and/or may be used to train multiple neural networks.

As long as there are more 120 images, the process 100 will continue to obtain 110 more images. The images may be stored in a repository (e.g., in attached storage 330 or 340 in FIG. 3) and/or may be obtained by a training system (e.g., training system 310 of FIG. 3) via an API or other means. When there are no more 120 user interface images to obtain 110, a neural network is trained 130 to detect user interface controls and their interaction purposes based on the images obtained 110 and the interaction purposes and locations of controls. Any appropriate type of neural network may be used. For example, the trained 130 neural network may be a feed forward neural network, convolutional neural network, deep neural network, radial basis function neural network, self-organizing neural network, recurrent neural network, modular neural network, or the like. As discussed elsewhere herein, there may be a single or multiple neural networks trained. For example, if there are multiple sets of images (e.g., one for automobile refinance and one for lender signup), then each set may be used to train 130 a separate neural network, and/or both sets together may be used to train 130 a combined neural network.

As discussed in more detail elsewhere herein, including with respect to process 200 of FIG. 2, the trained 130 neural network(s) can be used to later assist in simulating interaction with user interfaces.

Figure 2:
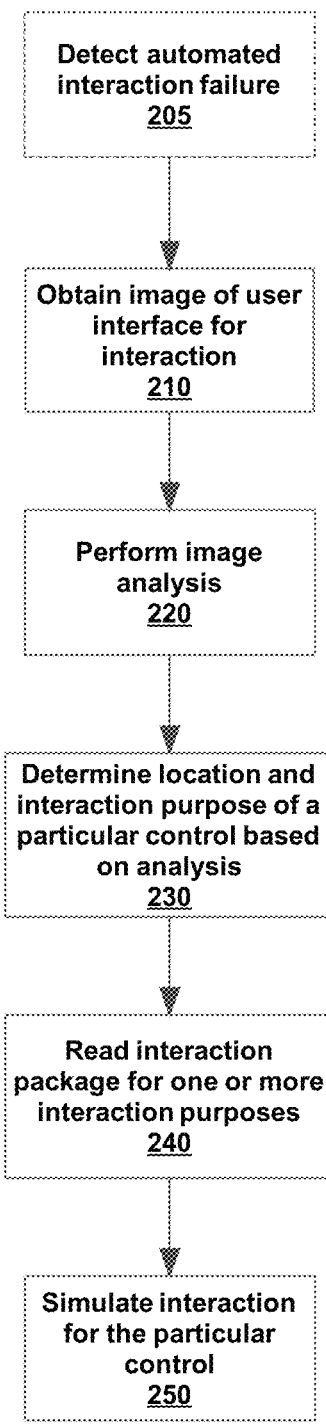
FIG. 2 depicts a process for simulating user interface interactions resilient to user interface changes.

Example Process for Simulating User Interface Interactions Resilient to User Interface Changes FIG. 2 depicts a process 200 for simulating user interface interactions resilient to user interface changes. At a high level, process 200 being by optionally detecting 205 a failure with a user interaction script. In some embodiments, the process begins by obtaining 210 an image of a user interface (whether or not there was a failure with a user interaction script for that user interface). The obtained 210 image depicts a user interface with controls. The process 200 proceeds by performing 220 image analysis on the image of the user interface (e.g., in some embodiments, using the neural network created with process 100). Based on the image analysis performed 220, location and interaction purpose of a particular control is determined 230. Interaction data is read 240 for one or more interaction purposes, and interaction with the particular control is simulated 250. In some embodiments, the interaction purpose and location for more than one control is determined 230 and interaction for each of those controls is simulated 250, possibly simultaneously or in sequence. For example, if an image of a web page has a submit button, multiple text boxes, one for full name, one for address, and those for city, state, and zip, the location and interaction purpose for each may be determined 230 and interaction with each text box may be simulated 250 simultaneously or in sequence before simulating the pressing of the submit button.

Returning to the top of process 200, the process optionally starts by detecting 205 a failure of an automated interaction with a user interface. As discussed elsewhere herein, an interaction simulation system may be attempting to use an interaction script to simulate interaction with a user interface (UI). For example, there may be an interaction script running (e.g., as part of UI interaction simulator 320 of FIG. 3) that is testing interaction with system 350. System 350 may have had a change to its user interface (e.g., as part of a change for all users, or as part of AB testing). The interaction script being used by UI interaction simulator 320 may fail, and such failure may be detected 205. That is, if an interaction script is able to successfully simulate interaction with a user interface (and there is no detected 205 failure), the process 200 may not take over simulated interaction with the interface from the interaction script. As discussed elsewhere herein, the failure may have been caused by something as minor as a change in the position of an interface control, a minor change in the text associated with the interface control, or the like.

In some embodiments, the process 200 proceeds without first awaiting the detection 205 of a failure of an interaction script. In such embodiments, the first step in interacting with any interface is obtaining 210 an image of the user interface. For example, it may be the case that all simulated interactions with the interface are handled by the process 200 (and not a separate interaction script, the failure of which is detected 205).

The image obtained 210 may be of any appropriate format, including JPEG, PNG, TIF, GIF, etc. The image may be obtained as part of a failure message (see, e.g., failure detection 205 above), or as part of the execution of a simulated interaction with a system. In some embodiments, the image is obtained 210 via an API that is used to request simulated interaction. In some embodiments, images of user interfaces may be deposited in a file repository, and the images may be obtained 210 from the file repository. In some embodiments, as discussed elsewhere herein, user interfaces may have underlying source code (such as HTML, JavaScript, etc.). The images obtained 210 will not include any of the underlying source code.

Once the image is obtained 210, analysis is performed 220 on the image. The image analysis may include one or more steps. For example, in some embodiments, analysis may first be performed to detect boundaries and locations of controls, and control type (e.g., text box, drop down menu, button, etc.). This analysis may be performed, e.g., using the neural network trained 130 as part of process 100. As a send step, optical character recognition may be performed on text within or near the controls. In some embodiments, that text determined from optical character recognition may be used to determine business purpose. Determining the interaction purpose of a control may include mapping the text detected to an interaction purpose. For example, if "full name" is detected, that may indicate an interaction purpose of "full name". Additional examples of control text and related interaction purposes are given elsewhere herein. In some embodiments, the optical character recognition may use a pre-defined dictionary to overcome common errors in optical character recognition. For example, the pre-defined dictionary may include mappings from common errors to corrected text such as "continue" to "continue" and "ontinu" to "continue". If the recognized text associated with a control is in the pre-defined dictionary, then it may be mapped to corrected text to determine the interaction purpose of the control. In some embodiments, the analysis performed may include providing a confidence score for any of the control type, control location, text associated with the control, and the interaction purpose. If there is low confidence in some aspect of the analysis performed 220, then the analysis may be flagged for further review, and or to indicate further training 130 may be needed.

In some embodiments, the controls, their locations, the control type, and the interaction purpose can be determined in a single step, using, e.g., a single neural network (such as the neural network trained 130 as part of process 100) may be performed 220 and that may detect control(s), location(s), text, and/or interaction purpose(s), as part of that single analysis.

As noted above, performing 220 the image analysis may include determining the locations and/or interaction purposes of one or more controls for depicted on the user interface. The locations determined may be of any appropriate type or measure. For example, the locations of the controls can be in pixel space (e.g., with 0,0 being the upper-left pixel), in a percentile location with respect to the image (e.g., 0-100% in each axial direction), in physical measurement space (e.g., 0" through height in one direction and 0" through width in the other), or the like.

The interaction purposes for controls may be any appropriate purpose and may include more than one interaction purpose. For example, in analyzing image 500 of FIG. 5A, the "full name" control may be detected, and its interaction purpose indicated as "name", "full name", a combination of "first name" and "last name", or the like. The product choice controls 510-512 may also be detected and their interaction purposes may be "select choice 1" for 510, "select choice 2" for 511, and "select choice 3" for 512. If, for example, choice 1 is related to "new user signup", then choice 510 may be associated with interaction purpose "new account" or "new user signup".

The locations and/or interaction purposes may be stored in any appropriate format, including JSON, other plain text (e.g., a comma-delimited list), binary, etc.

Based on the image analysis performed 220, the location and interaction purpose for a particular control is determined 230. As described elsewhere, performing 220 image analysis may detect a single interface control or multiple controls, and related locations and interaction purposes. Determining 230 the location and interaction purpose of a particular user interface control may include accessing the information generated by the image analysis performed 220. Example embodiments of locations and interactions purposes are discussed elsewhere herein.

An interaction package is read 240 for one or more interaction purposes. As discussed elsewhere herein, the interaction package may contain interaction data that can be used to simulate user interaction. For example, the interaction package contains a name, address, and product choice for a user. Each of these data may be associated with an intended interaction purpose. The interaction package can be read 240 to obtain a name, address, and product choice and the associated interaction purpose. These may be used for simulating user interaction for the particular control. In some embodiments, the interaction package may contain more than one set of data for interacting (e.g., for multiple "runs" of the simulated interaction), and subsequent readings of the interaction package may return subsequent sets of interaction data (e.g., simulating different users, and/or different user flows). In some embodiments, reading 240 the interaction package includes obtaining simulated interaction data for the determined interaction purpose for the particular control. For example, if the particular control is the "first name" control 521 in image 501, then the interaction data may be read 240 to determine a first name to use to simulate interaction with the particular control.

After the interaction package is read 240, interaction for the particular control is simulated 250. In some embodiments, simulating 250 interaction for the particular control is accomplished by using the location for the particular control to allow for control (e.g., by simulating user mouse movement or other interaction) to input (e.g., by simulated typing) the data read 240 from the interaction package. For example, if a first name was read 240 from the interaction package and the location of the first name control 521 of image 501 was determined 230, the first name can be used to input into the first name control 521 in the user interface depicted by image 501. Stated another way, and additionally referencing FIG. 3, a UI interaction simulator 320 may be simulating 250 user interactions with a system 350. The UI interaction simulator 320 may obtain 210 an image 501 of a user interface from the system 350 and perform 220 image analysis on that image 501 and may determine 230 locations and interaction purposes of interface controls on the image 501, including for a particular control, such as first name text box control 521. The UI interaction simulator 320 may the read 240 an interaction package that has interaction purposes in it, including, e.g., a first name to use as part of the simulation. The UI interaction simulator 320 may then use the read 240 interaction purposes in order to simulate 250 user interactions with system 350, by "typing in" the first name into the location determined 230.

Simulating 250 user interactions for the particular control may include simulating typing into a text box, selecting from a drop-down box (e.g., state drop down control 544), selecting a box (e.g., product choice control 510-512), pressing a button (e.g., submit button control 550 of image 500 or proceed button control 551 of image 501), and the like. In some embodiments, simulating 250 user interactions may include executing or interpreting JSON or other scripts or programs that simulate a user typing in data, selecting choices, pressing buttons, etc.

In some embodiments, interaction may be simulated 250 for more than one control at a time. For example, the locations and interaction purposes for multiple controls may be determined 230, and interactions with the multiple controls may be simulated 250 simultaneously and/or in sequence based on the information read 240 from the interaction package. For example, interaction can be simulated by typing in full name into control 520 of the user interface associated with image 500, street information into control 530, product choice selected in one of controls 510-512, city, state, and zip could be input into control 540, all before simulating the pressing of the submit control 550.

In some embodiments, not depicted in FIG. 2, an interaction script (e.g., one that is part of an interaction package) can be updated (or created) based on the simulated 250 interaction (e.g., using the created JSON script related to interact with the control). For example, if the process 200 began by detecting 205 a failure in an interaction script, then the failure in the interaction script may be corrected based on the simulated 250 interaction. For example, if an interaction script failed because it expected a "full name" text box control 520 in image 500 but instead say a first name text box control 521 and last name text box control 522, and process 200 simulated 250 interaction with those two controls 521 and 522, then the originally-failing interaction script can be updated to, for example, mimic the simulation 250 with the two controls 521 and 522. Such an updated script can then be saved and used to simulate interaction in later iterations of testing. Similarly, in some embodiments, a new interaction script can be created based on the simulation 250 of interaction with a user interface. The new script could then be used to simulate interaction with the user interface without invoking process 200.

System Overview

Figure 3:
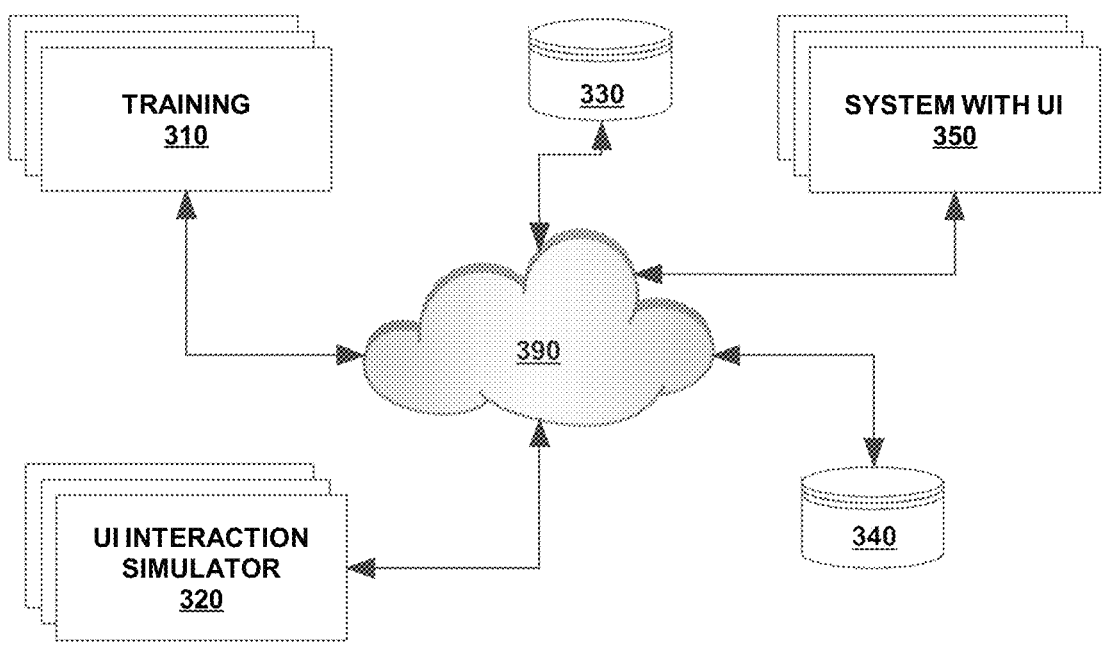
FIG. 3 depicts an example system for simulating user interface interactions resilient to user interface changes.

FIG. 3 depicts an example system for simulating user interface interactions resilient to user interface changes. System 300 includes elements connected by a communicative coupling or network 390. Examples of communicative coupling and networks are described elsewhere herein. In some embodiments, the processes 100 and/200 may run on the system 300 of FIG. 3 and/or the hardware 400 of FIG.

4. The user interface being tested may be part of system 350. The interaction packages may be stored at training system 310, user interface interaction simulator 320, and/or communicatively coupled storage 330 or 340. A user interface interaction simulator 320 may interact with system 350 in order to simulate user interaction with system 350. In some embodiments, either user interface interaction simulator 320 or training system 310 may perform processes 100 and 200, or processes 100 and/or 200 may be executing in part on each. For example, the described functions of process 100 may be performed by training system 310 and/or process 200 may be performed by UI interaction simulator 320. Each of training system 310, user interface interaction simulator 320, and/or system 350 may run on a single computing device, multiple computing devices, in a distributed manner across a network, on one or more virtual machines, which themselves run on one or more computing devices. In some embodiments, training system 310, user interface interaction simulator 320, and system 350 are distinct sets of processes running on distinct sets of computing devices. In other embodiments, training system 310, user interface interaction simulator 320, and system 350 are intertwined or share processes or functions and/or run on the same computing devices (not depicted in FIG. 3). In some embodiments, storage 330 and 340 are communicatively coupled to training system 310, user interface interaction simulator 320, and system 350 via a network 390 or other connection. Storage 330 and 340 may also be part of or integrated with training system 310, user interface interaction simulator 320, and/or system 350. In some embodiments, the training system 310 and/or user interface simulator 320 may use any appropriate system, technique, framework, software, or model for object detection, including Faster R-CNN (Faster R convolutional neural network), R-FCN (region-based fully convolutional network), SSD (single-shot detector), YOLO (You only look once) real-time object detection, and/or others. In some embodiments, the training system 310 and/or user interface simulator 320 may use any appropriate system, framework, technique, software, or model for deep learning, such as Caffe, CNTK (Microsoft Cognitive Toolkit), Darknet, Deeplearning4j, Gluon, Keras, MxNet, PyTorch, Tensorflow, and/or others.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
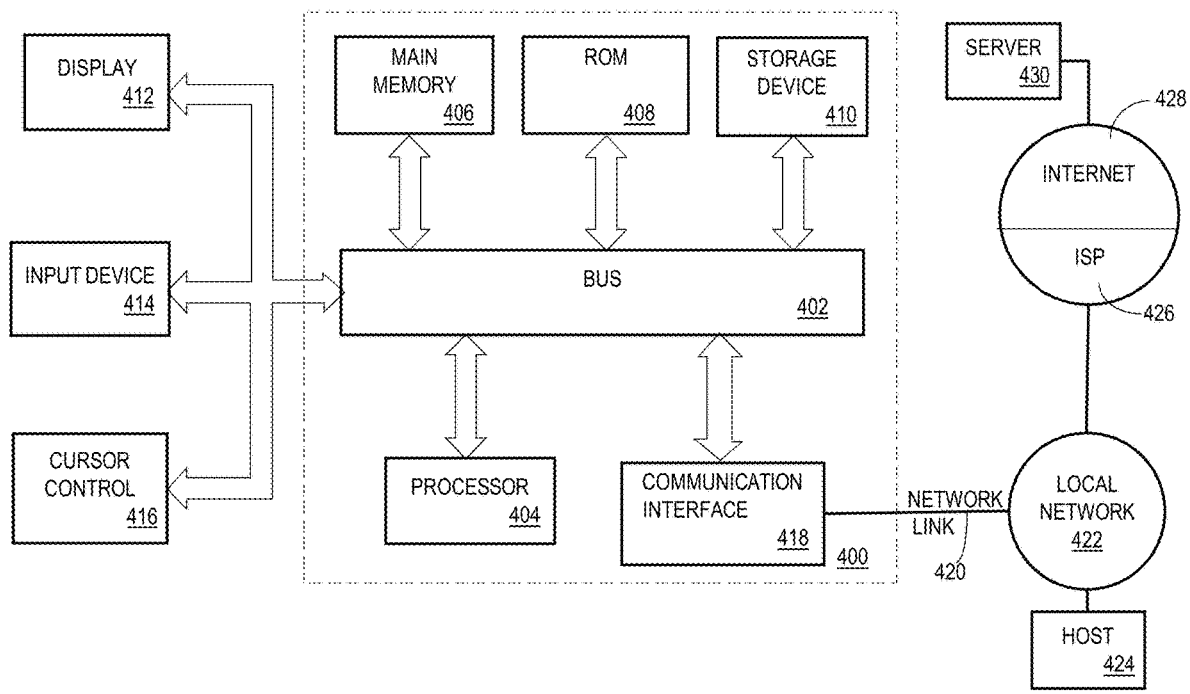
FIG. 4 depicts example hardware for simulating user interface interactions resilient to user interface changes.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   creating a training dataset comprising a plurality of images of graphic user interfaces, a plurality of interaction purposes that correspond to the plurality of images of graphic user interfaces, and a plurality of locations of controls that correspond to the plurality of images of graphic user interfaces;
   training a machine learning system thereby generating a trained machine learning system based on the training dataset, the trained machine learning system configured to:
      recognize locations of user interface controls and recognize interaction purposes of user interface controls;
   responsive to receiving an indication of a simulated user interaction failure of a user interaction script with a user interface:
      obtaining an image of the user interface that the simulated user interaction failure occurred on,
      using the machine learning system, determining a location of a particular user interface control in the user interface based on the image of the user interface, and
      using the machine learning system, determining a particular interaction purpose of the particular user interface control in the user interface based on the image of the user interface;
   reading an interaction package that indicates one or more interaction purposes that are to be carried out through interactions with the user interface;
   simulating user interactions with the user interface to carry out the one or more interaction purposes indicated in the interaction package;
   wherein one of the one or more interaction purposes specified in the interaction package includes the particular interaction purpose;
   wherein simulating user interactions comprises simulating user interaction with the particular user interface control, based on the location determined for the particular user interface control, to achieve the particular interaction purpose;
   wherein the method is performed by one or more computing devices.

2. The method of claim 1, further comprising:
   determining a new interaction approach for a user interface control on which the simulated user interaction failure occurred, wherein the new interaction approach can simulate user interaction with the user interface control without subsequently detecting the user interface control in an image of the user interface.

3. The method of claim 2, further comprising:
   updating the interaction package based at least in part on the new interaction approach for the user interface.

4. The method of claim 2, further comprising:
   determining a corresponding user-interface location of the user interface control; and
   wherein:
      determining the new interaction approach for the user interface control comprises interacting with the user interface control at the corresponding user-interface location.

5. The method of claim 1, wherein a choice to use the user interface is based on an AB testing balance, and wherein the interaction package enables interaction with an original user interface different from the user interface.

6. The method of claim 1, further comprising:
training the machine learning system to recognize control types of multiple user interface controls; and
determining a control type for the particular user interface control in the user interface using the machine learning system; and
wherein:
simulating user interactions with the user interface comprises simulating user interactions based at least in part on the control type for the particular user interface control.

7. One or more non-transitory storage media storing instructions which, when executed by one or more computing devices, cause:
creating a training dataset comprising a plurality of images of graphic user interfaces, a plurality of interaction purposes that correspond to the plurality of images of graphic user interfaces, and a plurality of locations of controls that correspond to the plurality of images of graphic user interfaces;
training a machine learning system thereby generating a trained machine learning system based on the training dataset, the trained machine learning system configured to:
recognize locations of user interface controls and recognize interaction purposes of user interface controls;
responsive to receiving an indication of a simulated user interaction failure of a user interaction script with a user interface:
obtaining an image of the user interface that the simulated user interaction failure occurred on,
using the machine learning system, determining a location of a particular user interface control in the user interface based on the image of the user interface, and
using the machine learning system, determining a particular interaction purpose of the particular user interface control in the user interface based on the image of the user interface;
reading an interaction package that indicates one or more interaction purposes that are to be carried out through interactions with the user interface;
simulating user interactions with the user interface to carry out the one or more interaction purposes indicated in the interaction package;
wherein one of the one or more interaction purposes specified in the interaction package includes the particular interaction purpose;
wherein simulating user interactions comprises simulating user interaction with the particular user interface control, based on the location determined for the particular user interface control, to achieve the particular interaction purpose.

8. A method comprising performing a machine-executed operation involving instructions, wherein said instructions are instructions which, when executed by one or more computing devices, cause performance of certain steps including:
creating a training dataset comprising a plurality of images of graphic user interfaces, a plurality of interaction purposes that correspond to the plurality of images of graphic user interfaces, and a plurality of locations of controls that correspond to the plurality of images of graphic user interfaces;
training a machine learning system thereby generating a trained machine learning system based on the training dataset, the trained machine learning system configured to:
recognize locations of user interface controls and recognize interaction purposes of user interface controls;
responsive to receiving an indication of a simulated user interaction failure of a user interaction script with a user interface:
obtaining an image of the user interface that the simulated user interaction failure occurred on,
using the machine learning system, determining a location of a particular user interface control in the user interface based on the image of the user interface, and
using the machine learning system, determining a particular interaction purpose of the particular user interface control in the user interface based on the image of the user interface;
reading an interaction package that indicates one or more interaction purposes that are to be carried out through interactions with the user;
simulating user interactions with the user interface to carry out the one or more interaction purposes indicated in the interaction package;
wherein one of the one or more interaction purposes specified in the interaction package includes the particular interaction purpose;
wherein simulating user interactions comprises simulating user interaction with the particular user interface control, based on the location determined for the particular user interface control, to achieve the particular interaction purpose,
wherein the machine-executed operation is at least one of (a) sending said instructions, (b) receiving said instructions, (c) storing said instructions, or (d) executing said instructions.

9. The method of claim 8, the certain steps further comprising:
determining a new interaction approach for a user interface control on which the simulated user interaction failure occurred, wherein the new interaction approach can simulate user interaction with the user interface control without subsequently detecting the user interface control in an image of the user interface.

10. A system comprising:
one or more processors;
one or more non-transitory data storage media operatively coupled to the one or more processors;
wherein the one or more non-transitory data storage media stores instructions which, when executed using the one or more processors, cause:
creating a training dataset comprising a plurality of images of graphic user interfaces, a plurality of interaction purposes that correspond to the plurality of images of graphic user interfaces, and a plurality of locations of controls that correspond to the plurality of images of graphic user interfaces;
training a machine learning system thereby generating a trained machine learning system based on the training dataset, the trained machine learning system configured to:
recognize locations of user interface controls and recognize interaction purposes of user interface controls;

responsive to receiving an indication of a simulated user interaction failure of a user interaction script with a user interface:
  obtaining an image of the user interface that the simulated user interaction failure occurred on,
  using the machine learning system, determining a location of a particular user interface control in the user interface based on the image of the user interface, and
  using the machine learning system, determining a particular interaction purpose of the particular user interface control in the user interface based on the image of the user interface;
reading an interaction package that indicates one or more interaction purposes that are to be carried out through interactions with the user interface;
simulating user interactions with the user interface to carry out the one or more interaction purposes indicated in the interaction package;
wherein one of the one or more interaction purposes specified in the interaction package includes the particular interaction purpose;
wherein simulating user interactions comprises simulating user interaction with the particular user interface control, based on the location determined for the particular user interface control, to achieve the particular interaction purpose.

11. The system of claim 10, wherein the instructions include instructions which, when executed using the one or more processors, cause:
  determining a new interaction approach for a user interface control on which the simulated user interaction failure occurred, wherein the new interaction approach can simulate user interaction with the user interface control without subsequently detecting the user interface control in an image of the user interface; and
  determining a corresponding user-interface location of the user interface control; and
  wherein:
  determining the new interaction approach for the user interface control comprises interacting with the user interface control at the corresponding user-interface location.

12. The method of claim 1, wherein the particular interaction purpose of the particular user interface control in the user interface comprises a child interaction purpose from a hierarchy of interaction purposes of a user interface control from a previous version of the user interface.

13. The method of claim 1, wherein the particular interaction purpose of the particular user interface control in the user interface comprises an interaction purpose that did not exist in a previous version of the user interface.

* * * * *